Dec. 29, 1959   W. J. COULTAS   2,918,776
WINDROWING MEANS FOR CROP CONDITIONER
Filed Nov. 29, 1956
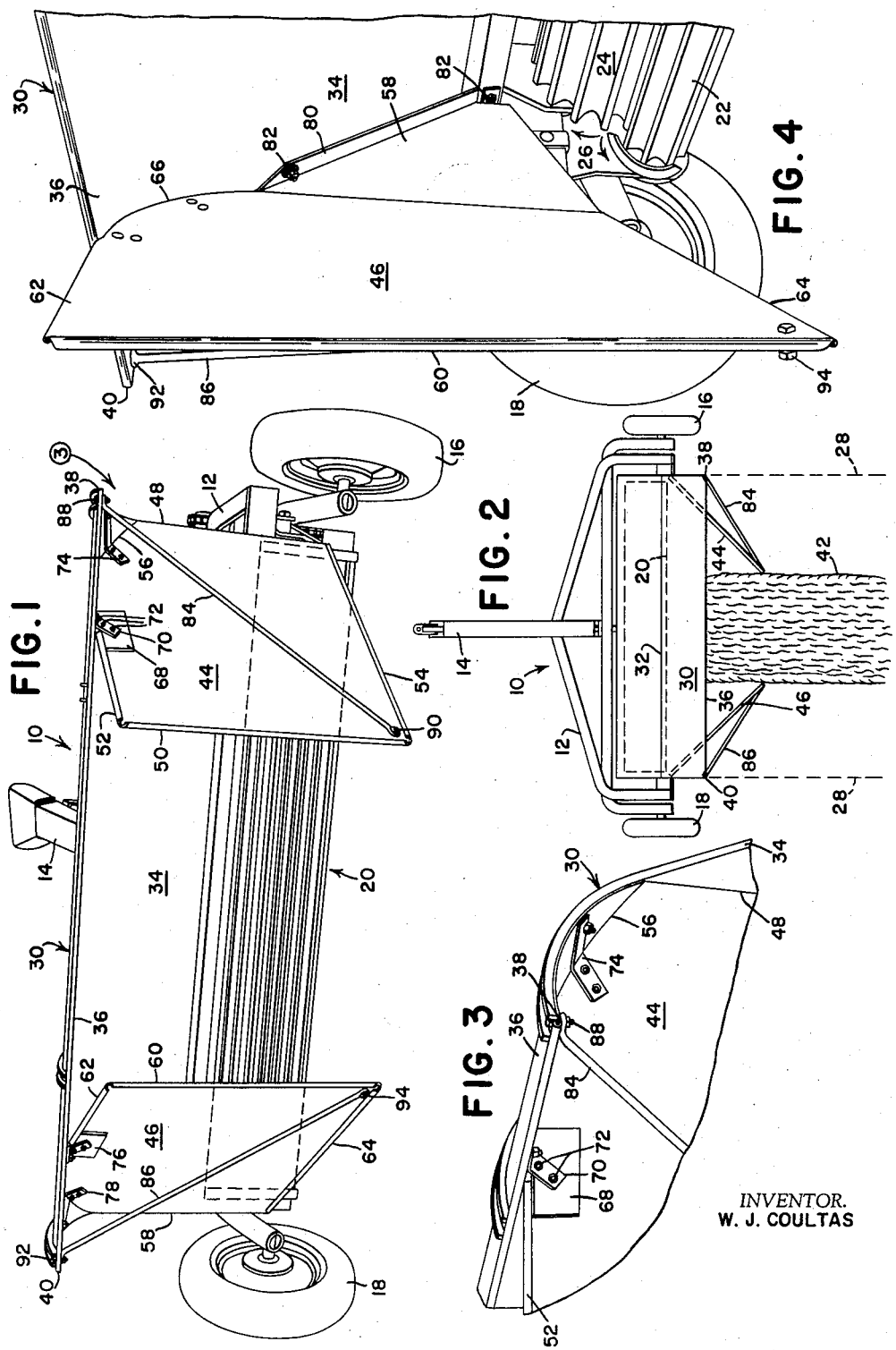
INVENTOR.
W. J. COULTAS United States Patent Office 2,918,776
Patented Dec. 29, 1959

2,918,776

WINDROWING MEANS FOR CROP CONDITIONER

Wilbur J. Coultas, Moline, Ill., assignor, by mesne assignments, to Deere & Company, a corporation of Delaware Application November 29, 1956, Serial No. 625,090

7 Claims. (Cl. 56—192)

This invention relates to crop handling machinery and more particularly to a windrowing shield or deflector for a crop conditioner of the type shown, for example, in the U.S. patent to Cunningham 2,711,622.

As disclosed in that patent, the conditioner includes a relatively wide frame carrying a pair of crop-conditioning rolls on parallel axes transverse to the line of advance, these rolls being operative to pick up and discharge crops rearwardly in a relatively wide stream. As a modification of a structure of the type just referred to, a rearwardly inclined shield is provided for preventing the crops from being thrown too high during their rearward discharge.

According to the present invention, the conditioner is further augmented by the provision of means for redirecting the crops into a materially narrow stream. Specifically, this means comprises a pair of rearwardly convergent deflector sheets mounted on the conditioner in such fashion as to redirect the stream into a relatively narrow stream centrally of the conditioner. It is an object of the invention that the shields can be used singly or in multiples to provide windrows of different types. It is a feature of the invention to provide novel mounting means for attaching the shields, or shield, to a conditioner of the type disclosed; although, it is broadly an object of the invention to utilize crop-redirecting means in other types of crop-conditioning machines.

The foregoing and other important objects and desirable features inherent in and encompassed by the invention will become apparent as a preferred embodiment thereof is disclosed in detail in the ensuing description and accompanying sheet of drawings, the several figures of which are described immediately below.

Fig. 1 is a rear perspective view of a crop conditioner having a pair of deflector sheets mounted thereon.

Fig. 2 is a diagrammatic plan view, drawn to a reduced scale, showing the operational characteristics of the deflector sheets.

Fig. 3 is an enlarged fragmentary perspective showing in greater detail that portion of the structure indicated by the arrow bearing the encircled numeral 3 in Fig. 1.

Fig. 4 is an enlarged fragmentary perspective illustrating in greater detail the mounting of the forward edge portion of one of the deflector sheets.

Since the basic conditioner structure is disclosed in the above-identified Cunningham patent, only brief reference to the machine will be made here. The conditioner is indicated in its entirety by the numeral 10 as comprising a main frame 12 having a draft tongue 14 by means of which the conditioner may be connected to a tractor or other draft vehicle, the frame 12 being rendered mobile on the basis of right and left hand relatively widely spaced apart ground-engaging wheels 16 and 18. The conditioner carries crop-conditioning means 20, here, as in the Cunningham patent, comprising a pair of bladed or corrugated rolls 22 and 24 which are operative in the directions of the arrows 26 (Fig. 4) to direct the crop rearwardly and upwardly in a relatively wide stream, normally having a width on the order of the distance between the dotted lines 28, 28 in Fig. 2.

In order to control the rearward and upward discharge of the crops, the conditioner is equipped with a rear shield 30, having a lower forward edge attachable at 32 to the main frame 12 of the conditioner and including an upwardly and rearwardly inclined front portion 34 which merges into a rearwardly curved upper portion 36. The shield is of course as wide as the normal stream of crops (the distance between the lines 28—28 in Fig. 2), and to this extent the shield has laterally opposite outer edge portions 38 and 40.

The means for redirecting the crop into a narrower stream, such as the relatively narrow windrow 42 (Fig. 2) comprises deflector elements or sheets 44 and 46 which, when used in pairs, produce the result indicated at 42.

The sheet 44 has front and rear and top and bottom edge portions 48, 50, 52 and 54 respectively, and the front and top edge portions 48 and 52 meet in a curved edge portion 56 which conforms to the curvature of the curved upper part 36 of the shield 30. The other shield 46 has similar front and rear and top and bottom edge portions 58, 60, 62 and 64, respectively, and again the junction between the front and rear edge portions 58 and 60 is curved at 66 to conform to the curvature of the shield upper part 36.

The upper edge portion 52 of the shield 44 has fastening means including a reenforcing plate 68 and an angular bracket 70, together with bolts 72 for fastening to the proximate portion of the shield 30. Similar fastening means, indicated generally at 74, is provided for the curved edge portion 56 (best shown in Fig. 3). Similar fastening means are provided at 76 and 78 for the other shield 46.

As best shown in Fig. 4, the forward edge 58, which conforms to the inclined portion 34 of the shield 30, is flanged at 80 to receive bolts at 82 for attachment to the shield 30 and to proximate portions of the conditioner proper. Although not visible in the drawings, it will be clear that a similar flange is provided for the shield 44, as are bolts similar to the bolts 82. Thus, the shields are relatively rigidly and easily mounted on the conditioner and for added strength are provided respectively with first and second brace means 84 and 86. The brace means 84 is connected at its upper end at 88 to the upper outer portion 38 of the shield 30 and extends downwardly, rearwardly and inwardly for connection at 90 to the lower rear corner of the shield 44. The other brace 86 extends from a connection 92 at the other outer portion 40 of the shield, downwardly, inwardly and rearwardly to a connection at 94 with the lower rear portion of the shield 46. The fastening means just described afford ready and convenient fasteners for quickly and easily mounting and dismounting the shields, whether used singly or in multiples.

In the arrangement shown, which is not the exclusive arrangement and which does not limit the scope of the invention, the windrow 42 is approximately one-third of the normal stream of crops to be discharged by the conditioner. If only one of the shields 44, 46 were used, the resultant windrow would be approximately two-thirds of the normal stream. These dimensions can of course be varied to suit individual desires. The arrangement shown is that deemed preferable on the basis of present experience.

Features of the invention other than those categorically enumerated will undoubtedly occur to those versed in the art, as will many modifications and alterations in the preferred embodiment of the invention disclosed, all of which may be achieved without departure from the spirit and scope of the invention.

What is claimed is:

1. In a crop conditioner adapted to advance over a field of previously harvested crops such as hay and the like and having relatively wide crop-conditioning means transverse to the line of advance and normally adapted to pick up, condition and discharge crops rearwardly in a stream of comparable width, the improvement comprising: a pair of upright deflector sheets, each having front and rear and top and bottom edge portions; and means for mounting the sheets on the conditioner with their front edge portions respectively adjacent to opposite outer ends of the conditioner means and their rear edges upright and closely spaced apart transversely so that the sheets converge rearwardly to direct the rearwardly discharged crops into a relatively narrow stream, said mounting means including fastening means on the front edge portions of the sheets, additional fastening means on the top edge portions of said sheets, and brace elements extending downwardly, laterally inwardly and rearwardly from the conditioner to the rear bottom edge portions of said sheets.

2. In a crop conditioner adapted to advance over a field of previously harvested crops such as hay and the like and having relatively wide crop-conditioning means transverse to the line of advance and normally adapted to pick up, condition and discharge crops upwardly and rearwardly in a stream of comparable width, and a comparably wide upwardly and rearwardly directed shield carried by the conditioner rearwardly of the conditioning means to intercept and guide the discharged crops, the improvement comprising: a pair of upright deflector sheets, each having front and rear and top and bottom edge portions; and means for mounting the sheets on the conditioner in rearwardly converging relation directly behind the shield, with the front edge portions of the sheets respectively adjacent to opposite outer sides of the shield and with the top and bottom edge portions projecting rearwardly past the shield upper portion to direct the rearwardly discharged crops into a relatively narrow stream, said mounting means including fastening means on the front edge portions of the sheets for connection to the shield, additional fastening means on the top edge portions of said sheets for connection to the shield, and brace elements extending downwardly, laterally inwardly and rearwarly from opposite upper portions of the shield respectively to the sheets adjacent to their rear and bottom portions.

3. In a crop conditioner adapted to advance over a field of previously harvested crops such as hay and the like and having relatively wide crop-conditioning means transverse to the line of advance and normally operative to pick up, condition and discharge crops upwardly and rearwardly in a stream of comparable width, and a comparably wide shield mounted on the conditioner rearwardly of the conditioning means and including an upwardly and rearwardly inclined front portion extending from the conditioning means and further including a rearwardly curved upper portion joined to the inclined portion, the improvement comprising: a pair of generally upright deflector sheets positionable rearwardly of the shield front portion and below the shield upper portion in rearwardly converging relation to intercept and materially narrow the conditioned and discharged crop stream, each sheet having front and rear and top and bottom edge portions, the top and front edge portions being shaped to be accommodated by the curved and inclined portions of the shield and said top and front edge portions having fastening means thereon connectible to said shield portions.

4. The invention defined in claim 3, including: a pair of brace means connectible respectively to laterally outer parts of the shield upper portion and extending downwardly, rearwardly and inwardly and connected respectively to the sheets adjacent the junctions of their rear and bottom edge portions.

5. The invention defined in claim 3, including: a pair of brace means connectible respectively to laterally outer parts of the shield and extending rearwardly and inwardly and connected respectively to the sheets at portions of the sheets spaced respectively below and rearwardly of the top and front edge portions of said sheets.

6. In a crop conditioner adapted to advance over a field of previously harvested crops such as hay and the like and having relatively wide crop-conditioning means transverse to the line of advance and normally operative to pick up, condition and discharge crops upwardly and rearwardly in a stream of comparable width, and a comparably wide shield mounted on the conditioner rearwardly of the conditioning means and including an upwardly and rearwardly inclined front portion extending from the conditioning means and further including a rearwardly curved upper portion joined to the inclined portion, the improvement comprising: a generally upright deflector sheet positionable rearwardly of the shield front portion and below the shield upper portion in rearwardly convergent relation to the line of advance to intercept and materially narrow the conditioned and discharged crop stream, said sheet having front and rear and top and bottom edge portions, the top and front edge portions being shaped to be accommodated by the curved and inclined portions of the shield and said top and front edge portions having fastening means thereon connectible to said shield portions.

7. The invention defined in claim 6, including: brace means connectible to a laterally outer part of the shield upper portion and extending downwardly, rearwardly and inwardly and connected to the sheet adjacent the junction of its rear and bottom edge portions.

References Cited in the file of this patent

UNITED STATES PATENTS

| 2,417,905 | Blaydes | Mar. 25, 1947 |
| 2,502,599 | Smart | Apr. 4, 1950 |
| 2,711,622 | Cunningham | June 28, 1955 |
| 2,747,354 | Bloser | May 29, 1956 |

FOREIGN PATENTS

| 256,783 | Switzerland | Sept. 15, 1948 |